United States Patent [19]

Pistor

[11] Patent Number: 4,946,231
[45] Date of Patent: Aug. 7, 1990

[54] POLARIZER PRODUCED VIA PHOTOGRAPHIC IMAGE OF POLARIZING GRID

[75] Inventor: Helmut H. Pistor, Fairfax, Va.

[73] Assignee: The United States of America as represented by the Secretary of the Army, Washington, D.C.

[21] Appl. No.: 354,162

[22] Filed: May 19, 1989

[51] Int. Cl.[5] .............................. G02B 5/00; G02B 1/00
[52] U.S. Cl. .................................... 350/1.1; 350/370; 350/162.17; 350/162.2; 350/320; 350/395
[58] Field of Search ............... 350/1.1, 162.12, 162.17, 350/162.20, 370, 1.6, 162.19, 162.2; 430/497, 9, 324; 355/125, 132; 360/77.03

[56] References Cited

U.S. PATENT DOCUMENTS

| | | | |
|---|---|---|---|
| 3,993,488 | 11/1976 | Oishi | 430/497 |
| 4,056,395 | 11/1977 | Sato et al. | 430/323 |
| 4,059,445 | 11/1977 | Sato | 430/324 |
| 4,277,138 | 7/1981 | Dammann | 350/1.1 |
| 4,362,796 | 12/1982 | Monroe | 430/9 |
| 4,456,515 | 6/1984 | Krueger et al. | 350/370 |
| 4,743,092 | 5/1988 | Pistor | 350/1.1 |
| 4,816,939 | 3/1989 | Ford et al. | 360/77.03 |

Primary Examiner—Bruce Y. Arnold
Assistant Examiner—Thong Nguyen
Attorney, Agent, or Firm—Milton W. Lee; John E. Holford; Anthony T. Lane

[57] ABSTRACT

A method of forming polarization grids for infrared optic systems is provided which uses conventional photographic media such as ordinary black and white film or plates in conjunction with a silver reduction process and far-infrared coating techniques.

5 Claims, 1 Drawing Sheet

POLARIZER PRODUCED VIA PHOTOGRAPHIC IMAGE OF POLARIZING GRID

The invention described herein may be manufactured, used, and licensed by the U.S. Government for governmental purposes without the payment of any royalties thereon.

BACKGROUND OF INVENTION

1. Field

The invention relates to polarizing grids for far infrared imaging systems and photographic processing of same.

2. Prior Art

Grid type polarizers or grating are basic elements of many optical measuring and signalling systems. The usual gratings are etched into solid blocks of material using massive ruling engines. In an earlier U.S. Pat. No. 4,743,092 by applicant "Polarization Grids for Far Infrared and Method for Making Same", issued 10 May 1988; a similar process is defined which requires the use of special polaroid films. An object of the present invention is to extend those teachings to the use of ordinary black and white film which is more readily available and comes in a greater variety of grain sizes, contrast, speed, backing materials, filters and emulsions.

BRIEF DESCRIPTION OF DRAWINGS

The invention is best understod with reference to the accompanying drawings, wherein.

DESCRIPTION OF THE PREFERRED EMBODIMENT

Figure 1:
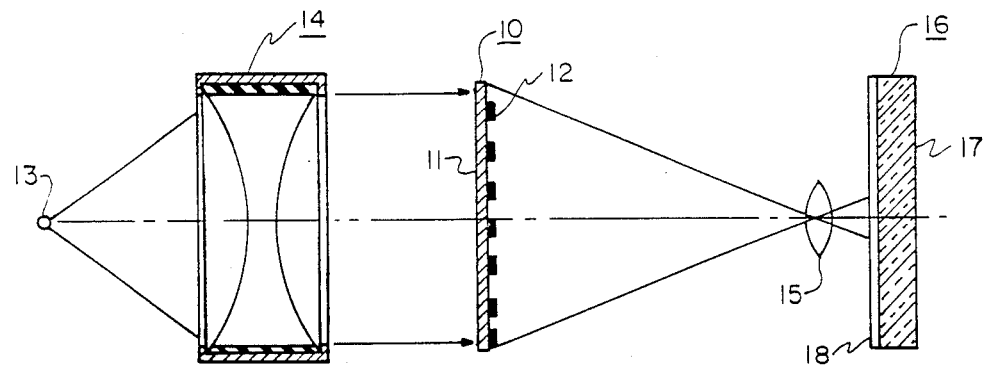
FIG. 1 shows an optical system suitable to carryout the initial steps in a method for making a far-infrared polarizing grid according to the present invention.

Referring to FIG. 1 near the center is shown an edge view of a commercial Ronchi ruling 10 which comprises a transparent (to visible light) substrate 11 and a series of opaque straight parallel lines 12 impressed on its front surface. Various line spacings are available, convenient values for applicants' purposes were found in the range of 10 to 100 lines/mm. The rulings are rectangular or square with dimensions of only a few inches. The rulings used were manufactured by Edmund Scientific located at Barrington, NJ.

The ruling is illuminated through the back surface of the substrate 11 by a small source 13 which is preferably collimated by either a refractive lens 14, as shown, or a parabolic mirror lens well known in the art. A camera type lens 15 forms a sharply focussed reduced image of the ruling on a film structure 16. The ruling operates well as a diffraction grating for visible light, but has too great a spacing to polarize such light. At 100 lines/mm the spacing of the rulings approach the wavelengths of many popular thermal viewing devices operating through the atmospheric window in the 8 to 14 micron wavelength range. A better spacing for polarizing light in the above wavelength range, is a quarterwave or less, e.g. is about 400 lines/mm or 2.5 microns. The increase from 10 or 100 lines/mm to 400 lines/mm is achieved by the image reduction mentioned above. The materials employed are also critical in the far-infrared range, since these radiations are highly absorbed by ordinary optical and photographic elements. These materials, in turn, depend on the type of film processing employed. A preferred starting material for the present polarizer is an ordinary sheet of black and white film consisting of any type of backing layer 17 with an emulsion layer 18, containing uniformly dispersed silver halide particles, attached to its front surface. For special applications the material of the backing layer may be chosen to be transparent to far-infrared, e.g. sapphire or IRTRON.

Figure 2:
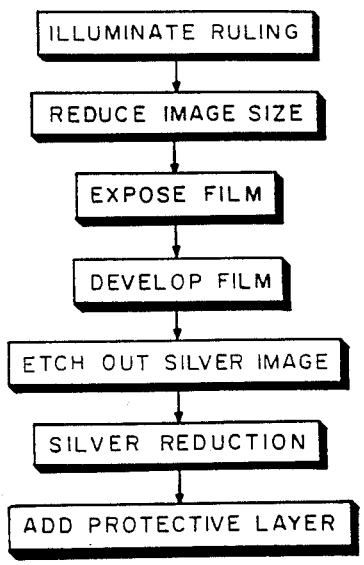
FIG. 2 shows a flow chart for performing the entire method.

FIG. 2 shows a flow diagram of the entire polarizer fabrication process. As indicated above, the ruling is illuminated first and the resulting light image is reduced to approximately a quarter wavelength in the far-infrared range, e.g. 2.5 microns.

The film is then developed to form a negative black image of the ruling in colloidal silver dispensed evenly through the thickness dimension. There also exists a positive image defined by unexposed silver halides. In the preferred embodiment the colloidal silver image is next etched away from the unfixed film. A silver diffusion is then performed on the silver halide image to define the lines in the image as strips of specularly reflecting electrically conducting silver. The special solutions needed to perform the above steps are described in U.S. Pat. No. 4,362,796, "Process of Making Photographic Prints Simulating Depth and Resultant Article" issued Dec. 7, 1982 to Robert Monroe.

The resulting image appears to be located near or at the top of the emulsion layer, since only a slight amount of abrasion is needed to remove it. Even without mechanical damage such as abrasion, chemical damage in the form of oxidation and loss of reflectivity takes place in a very short time. To prevent these from happening a protective layer is added. A simple way to do this is to use a toner or toning bath. Gold toner will provide improved conductivity and prevent oxidation. To prevent abrasion the exposed surfaces of the image and emulsion should be coated with a hard coating transparent to far-infrared radiation. A wax coating, e.g. carnauba wax, provides adequate protection at least for a short time. A more efficient and permanent coating is obtained by depositing silicon monoxide in a vacuum chamber.

The preferred method of using the polarizer is in the reflection mode. The only attenuation involved is due to imperfect reflection and absorption by the protective coating. As indicated above both of these factors can be minimized. With the proper choice of backing material a light beam can be polarized by passing it through the film. This can be advantageous for devices that separate and combine beams of different polarizations.

The term ordinary black and white film as used herein implies a simple, high resolution formulation. Normally such film uses only a backing and an emulsion with a silver halide sensitive only to ultraviolet and blue light. When dyes are added to extend the sensitivity to green and red light the terms orthochomatic and parchromatic are applied. Such films can be used, if desired, but are not required for best results.

I claim:

1. A method for forming a far-infrared polarization grating comprising the steps of:

optically projecting an image of a Ronchi ruling, wherein the ruling comprises numerous parallel lines impressed on the front surface of a transparent substrate, by illuminating the back surface of said substrate with a collimated light source;

focussing said image on a sheet of ordinary black and white film, having a backing layer and an emulsion layer with silver halides dispersed therein, such that the spacing between said parallel lines is about a quarter of the wavelength in the far-infrared range to be polarized;

developing said film to form a black image of said ruling formed of colloidal silver particles dispersed uniformly through the thickness dimension of said emulsion; and further processing said film using a silver diffusion procedure to obtain an electrically conductive image of said ruling in thin strips of specularly reflecting silver.

2. The method according to claim 1, further including the step of:

treating said image to protect said strips from chemical or mechanical damage.

3. The method according to claim 2, wherein said step of treating consists of:

plating said strips with gold by means of a gold toning bath.

4. The method according to claim 2, wherein said step of treating consists of:

coating the emulsion surface of said film with a hard non-abrasive material transparent to far-infrared radiation.

5. The method according to claim 2, wherein said step of treating consists of:

vacuum depositing a layer of silicon monoxide on the emulsion layer of said film.

* * * * *